United States Patent [19]

Nakamura

[11] 4,284,304
[45] Aug. 18, 1981

[54] MOUNTING STRUCTURE FOR THE FRONT SIDE EDGE OF A ROOF FINISHER OF A VEHICLE

[75] Inventor: Yoshiharu Nakamura, Koganei, Japan

[73] Assignee: Nissan Motor Company Limited, Japan

[21] Appl. No.: 58,773

[22] Filed: Jul. 19, 1979

[30] Foreign Application Priority Data

Sep. 12, 1978 [JP] Japan .......................... 53-125859[U]

[51] Int. Cl.³ ............................................. B62D 27/00
[52] U.S. Cl. ...................................... 296/201; 49/440; 296/29; 296/84 A; 296/146
[58] Field of Search ................. 296/210, 84 A, 84 D, 296/29, 201, 202, 146; 49/489, 490, 440

[56] References Cited

U.S. PATENT DOCUMENTS 3,526,428  9/1970  Porsche ................................ 280/756
3,641,707  2/1972  Kellos ..................................... 49/490

FOREIGN PATENT DOCUMENTS 2736225  2/1973  Fed. Rep. of Germany .......... 296/201
418248  10/1934  United Kingdom .
770509   3/1957  United Kingdom .

Primary Examiner—David M. Mitchell
Assistant Examiner—John A. Carroll
Attorney, Agent, or Firm—Lane, Aitken, Ziems, Kice & Kananen

[57] ABSTRACT

A roof finisher is mounted over the roof panel and the side pillars of a vehicle. The front edge of the part of the finisher mounted over a side pillar is secured to the side pillar by a mounting structure, comprising a first fitting member fixed on the front of the side pillar adjacent to the window glass and angling outwards and forwards, a second fitting member fixed to the front edge and angling backwards and inwards, and means for fixing these two fitting members together.

5 Claims, 3 Drawing Figures

MOUNTING STRUCTURE FOR THE FRONT SIDE EDGE OF A ROOF FINISHER OF A VEHICLE

BACKGROUND OF THE INVENTION

This invention relates generally to a roof finisher which is mounted over the roof and the side pillars of a vehicle, and more particularly relates to a structure for securing the front edge of the part of the roof finisher which covers the side pillars, to the side pillars.

In the art, it is well known to install a roof finisher over the roof of a vehicle, from one side to the other, the finisher also covering at least partially both side pillars of the vehicle. Although the rear part of the finisher has been mounted to the vehicle body by screws or the like, the front edge of previous finishers has merely abutted on the roof and side pillars, without any fixing. Therefore particularly the side front edges of the finisher are apt to become disengaged from the side pillars of the vehicle, when it is driven at speed.

SUMMARY OF THE INVENTION

Therefore it is an object of the present invention to provide a roof finisher in which the connection of the side pillars of the vehicle to the front edges of the sides of the finisher is improved.

It is a further object of the present invention to provide a roof finisher in which the connection of the side pillars of the vehicle to the front edges of the sides of the finisher should be ensured, even if any securing bolts or the like become accidentally disengaged.

These and other objects are attained, according to the present invention, by, in a vehicle comprising a roof panel, a side pillar, a side window glass supported by the side pillar, and a roof finisher mounted over part of the roof and at least part of the side pillar, a mounting structure for securing the front edge of the part of the roof finisher which is mounted over the side pillar to the side pillar, comprising: a first fitting member, fixed on the front of the side pillar, adjacent to the window glass, and angling forwards therefrom and away from the center line of the vehicle; a second fitting member, fixed on the front edge of the said part of the roof finisher, and angling backwards therefrom and towards the center line of the vehicle; and means for fixing the first and the second fitting members together.

BRIEF DESCRIPTION OF THE DRAWINGS

The present invention will become more fully understood from the following description of a preferred embodiment thereof, together with the accompanying drawings. It should be understood, however, that the description of the embodiment, and the drawings, are provided purely for the purposes of explanation only, and are in no way intended to limit the scope of the present invention, or of the limits of protection sought to be granted by Letters Patent, which are to be defined solely by the appended claims. In the drawings:

DESCRIPTION OF THE PREFERRED EMBODIMENT

Figure 1:
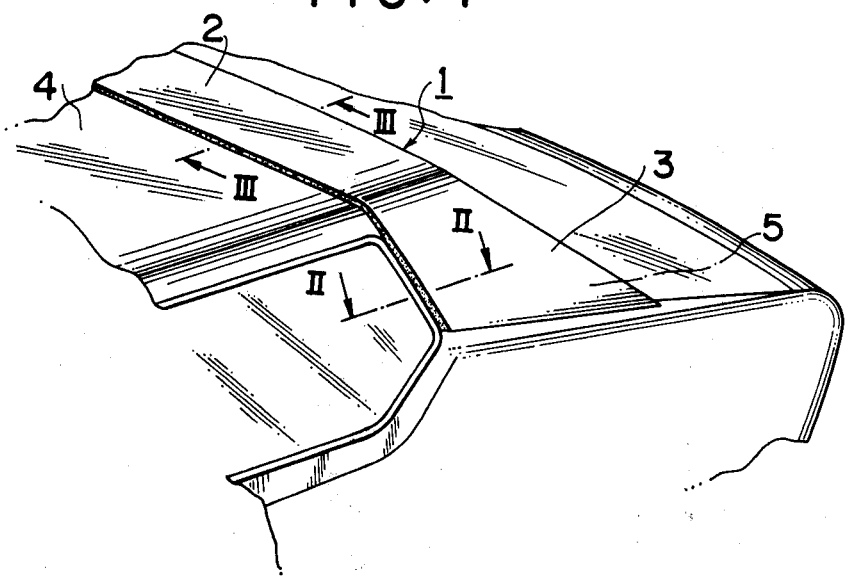
FIG. 1 is a perspective view, showing a roof finisher mounted using a mounting structure according to the present invention.

Referring to the drawings, the roof finisher, generally denoted as 1, consists of three parts: a center finisher portion 2, which covers the rear portion of the roof panel 4 of a vehicle, and two side finisher portions 3, each of which at least partially covers a rear side pillar 5 of the vehicle. In the drawings, only one side of the vehicle and the finisher is shown. The other is similar. In the illustrated embodiment, these three parts are formed as one piece, but this is not essential to the present invention, which can be in fact applied to a proposed type of finisher which is formed as three separate parts.

Figure 3:
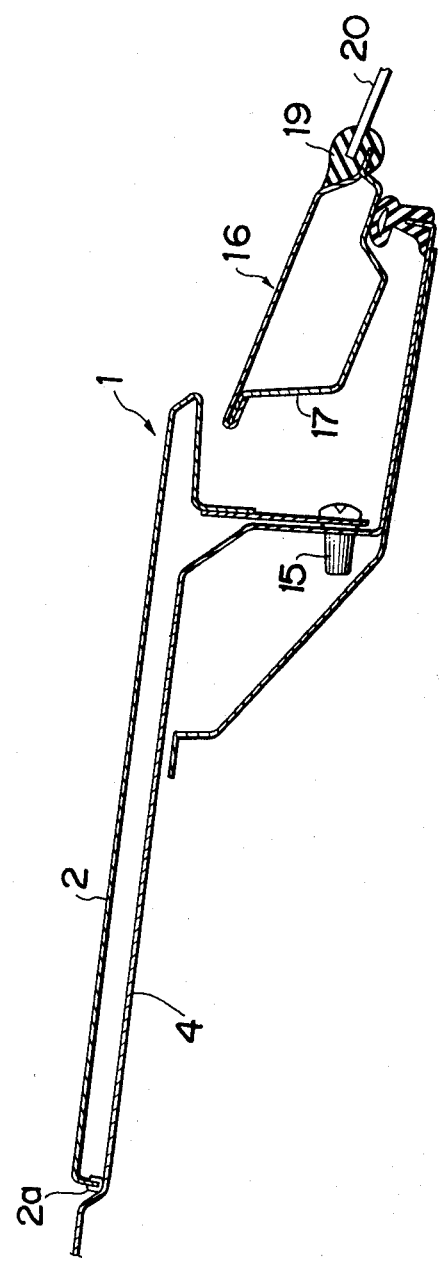
FIG. 3 is a sectional view, taken along the line III—III in FIG. 1.

The rear edges of the center finisher portion 2 and of the side finisher portions 3 are fixed to the rear edges of the roof panel 4 and the rear pillars 5 by means of screw grommets of a conventional type which are shown rather schematically in FIG. 3 by the reference numeral 15. FIG. 3 also shows structures of the rear hatch door of the vehicle, denoted by reference numerals 16, 17, 19, and 20, which are not relevant to the present invention, and also particularly shows at 2a the joining of the front edge of the roof finisher portion 2 to the roof 4 of the vehicle, in a way which is per se well known.

Figure 2:
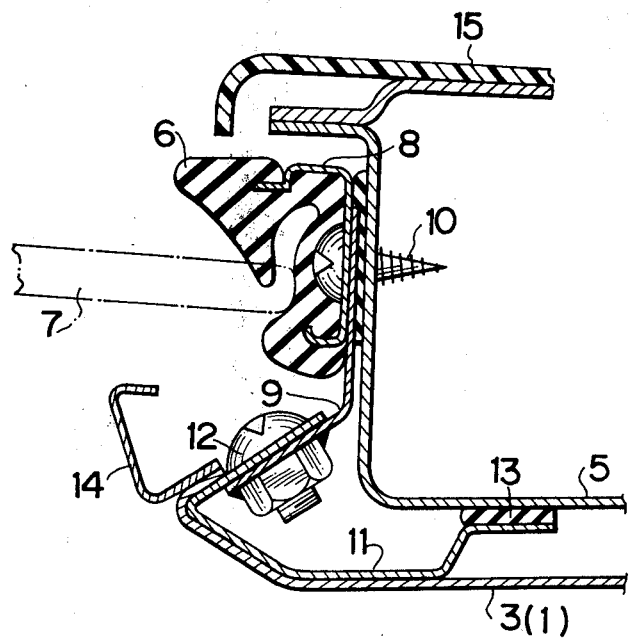
FIG. 2 is a sectional view, taken along the line II—II in FIG. 1.

FIG. 2 illustrates in detail the structure according to the present invention for fixing the front edge of the side finisher 3 to the side pillar 5. The weather strip 6 supports the side window glass 7 and seals its periphery against weather. The weather strip 6 is supported by a retainer 8. A first fitting member 9 is fixed, together with the retainer 8, on the front of the side pillar 5, by bolts 10. A projecting edge of this first fitting member is bent obliquely, so that it projects forwards towards the front of the vehicle, and outwards away from the center line of the vehicle. Reference numeral 15 denotes an inner trim of the vehicle.

A second fixing member 11 is fixed on the inside of the front edge of the side finisher 3, for example by welding, and one end of this member 11, which, in the shown embodiment, is a bracket member, is bent round so that it projects backwards towards the center line of the vehicle, and is joined to the first fixing member 9 by a bolt and nut assembly 12. It should be particularly noticed that, in the shown embodiment, the second fixing member 11 is bolted to the side of the first fixing member 9 which is nearer the center line of the vehicle. This provides a sort of hooking effect, so that, even if the bolt and nut assembly 12 should come loose by some accident, the front of the finisher side portion 3 should not be able to move away from the side pillar 5.

In the embodiment shown, the other end of the second fixing member 11 is bent inwards, and contacts the rear pillar 5 through a resilient member 13, which adheres to these members. Thus the front edge of the finisher side portion 3 is prevented from approaching the side pillar 5, as well as from moving away from it, and thereby between the tension in the left hand end as seen in the figure of the second fixing member 11, and the compression in its right hand end, the finisher side front edge is positively held in the correct position.

A decorative molding 14 is fixed to the front of the front edge of the finisher side portion, in order to hide the bolt and nut assembly 12 and the member 9 and 11 from view. It is because the first fitting member 9 is located adjacent to the window glass that it is possible both to access the bolt and nut assembly 12, and to conceal this assembly by the molding 14.

Although the present invention has been shown and described with reference to a preferred embodiment thereof, it should be understood that various changes and modifications of the form and the content thereof may be made by a man skilled in the art, without departing from the principles or the scope of the present invention. Therefore, this scope is to be determined, not by any details of the purely illustrative embodiment described, or of the drawings, but solely by the accompanying claims, which follow.

What is claimed is:

1. In a vehicle comprising a roof panel (4), a side pillar (5), a side window glass (7) supported by the side pillar (5), and a roof finisher (1) mounted over part of the roof panel (4) and at least part of the side pillar (5),
   a mounting structure for securing the front edge of the side portion (3) of the roof finisher (1) which is mounted over the side pillar (5) to the side pillar (5), comprising:
   a first fitting member (9), fixed on the front of the side pillar (5), adjacent to the window glass (7), and having one end angling forwards therefrom and away from the center line of the vehicle;
   a second fitting member (1), fixed on the front edge of the said side portion (3) of the roof finisher (1), and having one end angling backward therefrom and towards the center line of the vehicle; said one end of the first fitting member (9) interconnecting said one end of the second fitting member (11) such that a hooking effect is provided to prevent the front edge of the finisher side portion (3) from moving away from the first fitting member (9) and
   means (12) for fixing the first and the second fitting members (9, 11) together.

2. A mounting structure as in claim 1, wherein the fixing means (12) is a bolt and nut assembly (12), and the first fitting member (9), where it is fixed together with the second fitting member (11), is on the side thereof which is closest to the center line of the vehicle.

3. A mounting structure as in claim 1 further comprising a weather strip (6) and a retainer (8), the window glass (7) being supported in the weather strip (6) which is retained in the retainer (8), said retainer (8) being fixed to the front of said side pillar (5) together with said first fitting member (9).

4. A mounting structure as in claim 1, wherein a decorative molding (14) is fixed at the front side edge of the roof finisher (1), so as to hide from view said first and second fitting members (9, 11) and said fixing means (12).

5. A mounting structure as in claim 1, wherein said second fitting member (11) is a bracket (11) whose front end is joined to said first fitting member (9), and the rear end of said bracket (11) abuts on said side pillar (5) via a resilient member (13).

* * * * *